US 6,615,479 B2

(12) United States Patent  
Hiei

(10) Patent No.: US 6,615,479 B2  
(45) Date of Patent: Sep. 9, 2003

(54) ARMATURE WINDING APPARATUS

(75) Inventor: Takanori Hiei, Hadano (JP)

(73) Assignee: Odawara Engineering Company Limited, Kanagawa (JP)

( * ) Notice: Subject to any disclaimer, the term of this patent is extended or adjusted under 35 U.S.C. 154(b) by 0 days.

(21) Appl. No.: 10/058,906

(22) Filed: Jan. 30, 2002

(65) Prior Publication Data

US 2002/0108233 A1 Aug. 15, 2002

(30) Foreign Application Priority Data

Feb. 9, 2001 (JP) ........................................ 2001-034500

(51) Int. Cl.⁷ .......................... H02K 15/00; H01R 43/00
(52) U.S. Cl. ...................... 29/564.5; 29/735; 242/433.4
(58) Field of Search .............................. 29/564.5, 564.6, 29/566.1, 732, 735, 736, 564.8; 742/433.2, 433.3, 433.4

(56) References Cited

U.S. PATENT DOCUMENTS 3,785,034 A * 1/1974 Bucholtz ..................... 29/56.5
3,927,843 A * 12/1975 Dammar .................. 242/433.4
4,027,827 A * 6/1977 Biddison ................. 242/433.3
5,020,403 A * 6/1991 D'Angelo et al. ............. 83/171
5,090,107 A * 2/1992 Beakes et al. .............. 29/566.3
5,187,856 A 2/1993 Corey et al.

* cited by examiner

Primary Examiner—A. L. Wellington  
Assistant Examiner—Erica E Cadugan  
(74) Attorney, Agent, or Firm—Armstrong, Westerman & Hattori, LLP

(57) ABSTRACT

A cutter mounting bar (18) is attached between both left and right side walls of an outer shield (16) in an armature winding apparatus to be swingably rotatable, and it is biased in a direction in which a movable blade (21) provided integrally with a tip end portion is away from an axis X by a compression spring (19). When an inner shield (15) is rotated, a cam surface presses an adjustment screw (23) outward to swing a cutter mounting bar (18) in a direction in which the movable blade (21) approaches the axis X. In this state, when an armature (1) is rotated and a wire (7) connecting a hook wire connection portion and a gripper (30) is inserted between the movable blade (21) and a backing blade (22) to advance the outer shield (16) rightward, the backing blade (22) abuts against a groove bottom surface of the inner shield (15) and stops, and only the movable blade (21) advances rightward and severs the wire (7) at a position close to the hook wire connection portion.

8 Claims, 19 Drawing Sheets

ARMATURE WINDING APPARATUS

BACKGROUND OF THE INVENTION

1. Field of the Invention

The present invention relates to an armature winding apparatus for winding a coil around an armature of a motor, and particularly to an improvement of a cutting device for severing coil leads at start and finish of winding of each coil, which are connected to hooks of an armature commutator, at a position close to connection portions thereof.

2. Description of the Related Art

Conventionally, there is a dual drive winding apparatus, as an armature winding apparatus for winding a wire (enamel copper wire) fed from a rotating flyer around an iron core of an armature.

This winding apparatus includes a collet unit for gripping an armature shaft at an armature commutator side of the armature, which is fixedly provided with an armature core and the armature commutator (hereinafter abbreviated as "the commutator") on the same axis with a predetermined space being provided therebetween, and for performing indexing rotation while maintaining the axis line horizontal. Support shafts perpendicularly intersecting the axis line and moving close to or away from each other are provided at both sides in a horizontal direction with the armature axis line therebetween, wire-winding chucks for holding the armature core therebetween are swingably mounted at tip end portions of the support shafts, and a pair of flyers for feeding a wire for coil winding are rotatably mounted.

At the time of winding, prior to the rotation of the flyers, the above-described support shafts are moved in a direction to be close to each other to hold the armature core from both sides by a pair of the wire-winding chucks and simultaneously cover slots other than the wire-winding portions to lead the wires fed from the flyers to required two slots.

Further, after leads of the wires are gripped by grippers and by utilizing reverse rotation of the flyers, the coil leads of the start wires fed from the flyers are looped around hooks of the commutator to be connected thereto, the collet unit is made to perform indexing rotation to bring the armature in a predetermined rotational position, and the wires are wound around the required two slots of the armature core by rotating the flyers to thereby form first coils. At this point of time, the coil leads at the start of winding gripped by the grippers are severed by cutters, and a pair of the wire-winding chucks are retreated from the armature core.

Next, the collet unit is made to perform indexing rotation to place second hooks at the same positions as those of first wire connection positions, and the leads of the first coils at the finish of winding are made to be leads at the start of winding of second coils. In this manner, the same operations are repeated one by one to perform winding of the coil and connecting of the coil leads to the hooks, and the coil leads at the finish of winding are finally gripped by the grippers and severed by the cutter to finish winding wire for the armature.

There are some armatures in which the leads are pulled off by rotation of the armature instead of the leads at the start and the finish of winding of each coil being severed by the cutter.

However, in the conventional armature winding apparatuses as described above, depending on the cutting devices, in some armature winding apparatuses in which the leads at the start and the finish of winding of each coil are severed by cutters, the cutters have to pass through spaces between the grippers, flyers, the collet unit and the like to retreat so as not to interfere with them. For this reason, it is difficult to optimally select the positions of the cutters, and thus it is extremely difficult to sever the wound coil leads at the position close to the hooks to which they are connected.

When wires are to be wound around various kinds of armatures by the same armature winding apparatus, the position of the cutters has to be finely adjusted each time when a diameter of the commutator of an armature differs, thus causing the disadvantage that tremendous time and efforts are required to adjust it.

The armature winding apparatuses in which leads of the coils are pulled off by rotating the armatures have the disadvantage that they are applicable to only an extremely narrow range, because the hooks to which the coil leads are connected are sometimes bent when the wires with large diameters are wound around them, and severing of the wires are sometimes difficult depending on the shapes of the commutators.

Further, in order to eliminate the disadvantages as above, as shown in FIG. 19, a cutting device, which is constituted by attaching a single blade cutter 20 to a tip end portion of an outer shield 16 forming an external cylinder of a collet unit 10 gripping an armature shaft 2 of an armature 1 so as to cut the leads of the coils by movement of the outer shield 16 in the axial direction, is proposed.

However, with the cutting device as described above, it is necessary to provide the cutter 20 at an outer circumferential side of the hook 6 since the commutator 4 has to be inserted into an inside of the outer shield 16, and thus the coil leads cannot be severed to be the shortest.

As described above, in each of the armatures with wires being wound around by the armature winding apparatuses provided with the conventional cutting devices, the lead of each coil considerably protrudes from the hook of the commutator, to which the coil lead is connected, and therefore there is the fear that the protruding portion of the lead touches an adjacent commutator bar to short out, or catches on other components and falls off the hook when the lead of the coil is welded to the hook.

SUMMARY OF THE INVENTION

This invention is made to eliminate the above-described disadvantages, and its object is to make it possible to sever leads at start and finish of winding of a coil wound around an armature core at a position close to a connection portion of a wire looped around a hook of a commutator by means of an armature winding apparatus.

This invention is applied to an armature winding apparatus including a collet unit having on an outer circumferential portion an outer shield movable for a predetermined distance in a direction of an axis and an inner shield (also called a thimble) rotatable at a predetermined angle around the axis, flyers for feeding and winding wires to slots of an armature core supported to be able to perform indexing rotation by the collet unit while rotating to form coils in succession, a mechanism for looping wires at both end portions of the coils around hooks of an armature commutator, and cutting devices for severing leads of the coils at start and finish of winding.

In order to attain the above-described object, the above-described cutting devices are constituted by cutter mounting members attached to the above-described outer shield to be displaceable within a plane including the above-described axis and move with the outer shield in the direction of the above-described axis, and the cutters provided at tip end portions of the cutter mounting members to be able to advance and retreat to and from the above-described axis.

The cutter mounting member of the cutter device can be inserted to be displaceable between a pair of side walls extensively provided at the above-described outer shield to be displaceable. Further, the cutter mounting member is attached to the above-described outer shield to be swingably rotatable within a plane including the above-described axis, or attached to be able to advance and retreat in parallel with respect to the above-described axis.

Further, it is suitable that the cutter mounting member has cutter ingress means for making the above-described cutter get into the armature core side at a hook root portion of the armature commutator by rotating the above-described inner shield a predetermined angle around the above-described axis.

The cutter ingress means can be constituted by adjustment screws screwed into the above-described cutter mounting member to be able to advance and retreat in a direction to intersect the above-described axis perpendicularly, cam surfaces, which are provided at an outer circumferential portion of the above-described inner shield and are able to be engaged with the above-described adjustment screws, and biasing means for pressing the above-described adjustment screws against the cam surfaces.

Further, the cutter of the above-described cutting device may be constituted by a movable blade integrated with the above-described cutter mounting member, and a backing blade, which is provided to oppose the movable blade, biased in a direction to be pressed in contact with the above-described cutter mounting member, follows movement of the above-described cutter mounting member following retreat of the above-described outer shield, and moves with the above-described cutter mounting member until it abuts against the above-described inner shield and stops.

Furthermore, it is further preferable to provide a wire presser capable of pressing a wire connection portion of the hook of the armature commutator at an inner circumferential portion of the above-described inner shield to be movable in the direction of the above-described axis.

As a result that the cutting device is constituted as described above, the armature winding apparatus according to this invention can use the movement of the outer shield and the inner shield for the cutting device, which is conventionally used for the collet units of the armature winding apparatuses, facilitates winding of the wire fed from the flyer around the armature core by covering the hook of the commutator when a coil is wound, and facilitates wire connection by exposing a required hook when the coil lead is connected to the hook. Thus, the cutter member normally retreats outside to facilitate attachment and detachment of the armature to and from the collet unit, and it can get into an inside at the time of severing the lead of the coil and sever the coil lead at the position close to the wire connection portion of the hook.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of the present invention will be explained concretely with reference to the drawings.

First embodiment: FIG. 1 through FIG. 10

First, a first embodiment of an armature winding apparatus according to the present invention will be explained with reference to FIG. 1 through FIG. 10.

Figure 1:
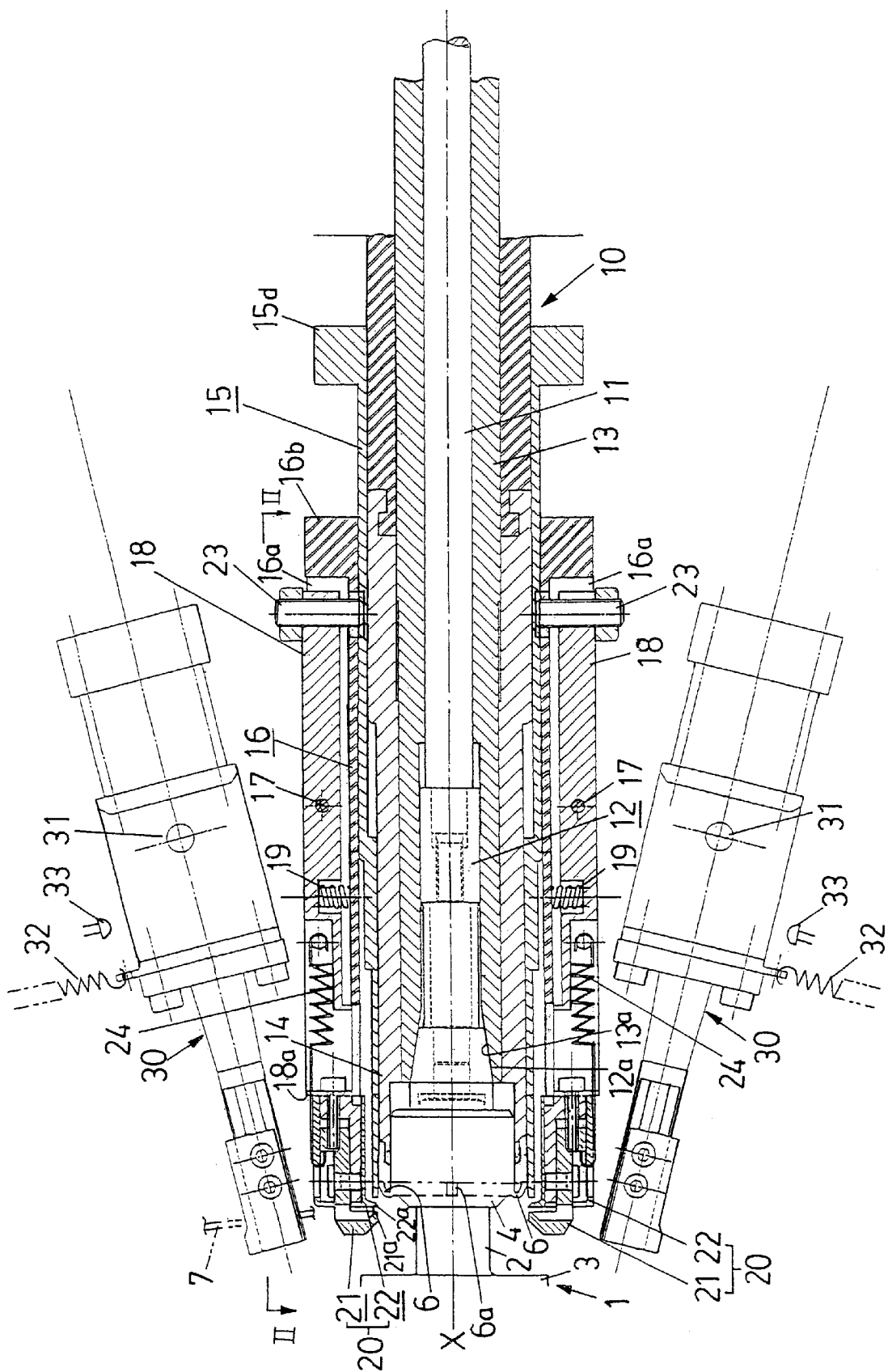
FIG. 1 is a longitudinal sectional view showing a main part of a first embodiment of the present invention.
Figure 2:
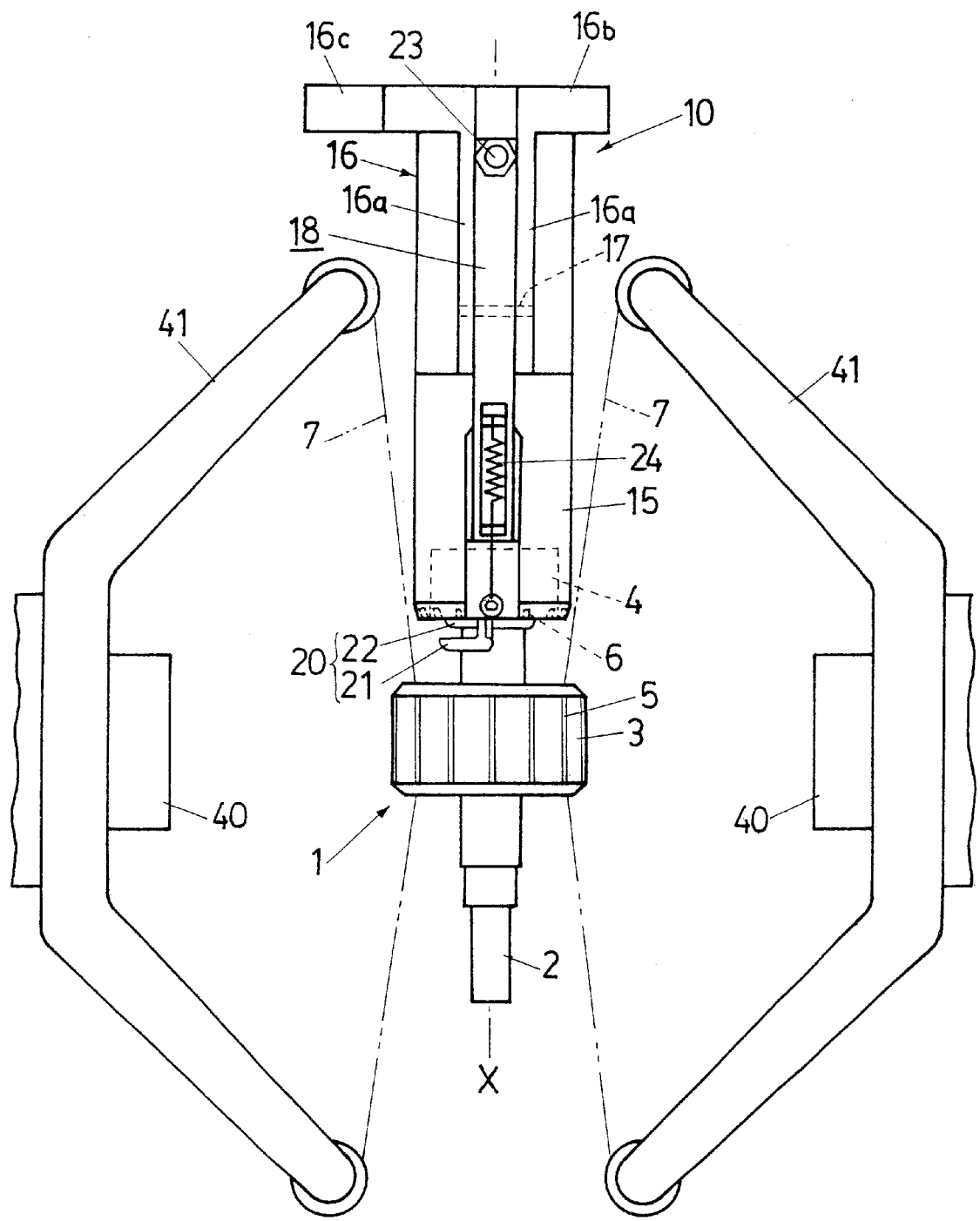
FIG. 2 is a plan view seen from a direction of the arrow II—II in FIG. 1 of the same embodiment.

An armature of a motor for which a wire is wound by this armature winding apparatus is constituted by an armature shaft 2, an armature core 3 press-fitted into the armature shaft 2 and a commutator 4 fixed to the armature shaft 2 with a predetermined space being provided, as an armature 1 shown in FIG. 1 and FIG. 2. The armature core 3 is provided with a number of slots 5 parallel to an axis X of the armature shaft 2 as shown in FIG. 2, and the commutator 4 is provided with as many commutator bars (not shown) each including a hook 6 at one end as an integral multiple of the number of the slots 5.

A collet unit 10 gripping the armature shaft 2 in a horizontal direction at the commutator 4 side of the armature 1 constituted as above is mounted so that a collet bar 11 provided in a center portion and a collet 12 integrally fixed at a tip end portion thereof are slidable in an outer tube 13 in an axial direction.

The collet 12 has a tapered surface 12a on an outer circumferential portion thereof, the tapered surface 12a is engaged with a tapered surface 13a provided on an inner circumferential portion of the outer tube 13, and by moving in the axial direction, the collet 12 can grip or release the armature shaft 2. In the state in which the collet 12 grips the armature shaft 2, an axis of the collet 12 conforms to the axis X of the armature 1.

A wire presser 14 is provided at an outer circumferential portion of the outer tube 13 to be slidable for a predetermined distance in a direction of the axis X, on its outer circumference, an inner shield 15 is mounted to be swingably rotatable at a predetermined angle around the axis X, and further on its outer circumference, an outer shield 16 constituting an outer cylinder is mounted to be movable for a predetermined distance in the direction of the axis X.

At the outer shield 16, pivots 17 and 17 are laid between a set of left and right side walls 16a and 16a provided to extend vertically, cutter mounting bars 18 and 18 each being a cutter mounting member are attached to be swingably rotatable within a plane including the axis X, and tip end sides (left end side in FIG. 1) of the cutter mounting bars 18 and 18 are biased in a direction to move away from the axis X by compression springs 19 and 19 constituting biasing means.

Figure 4:
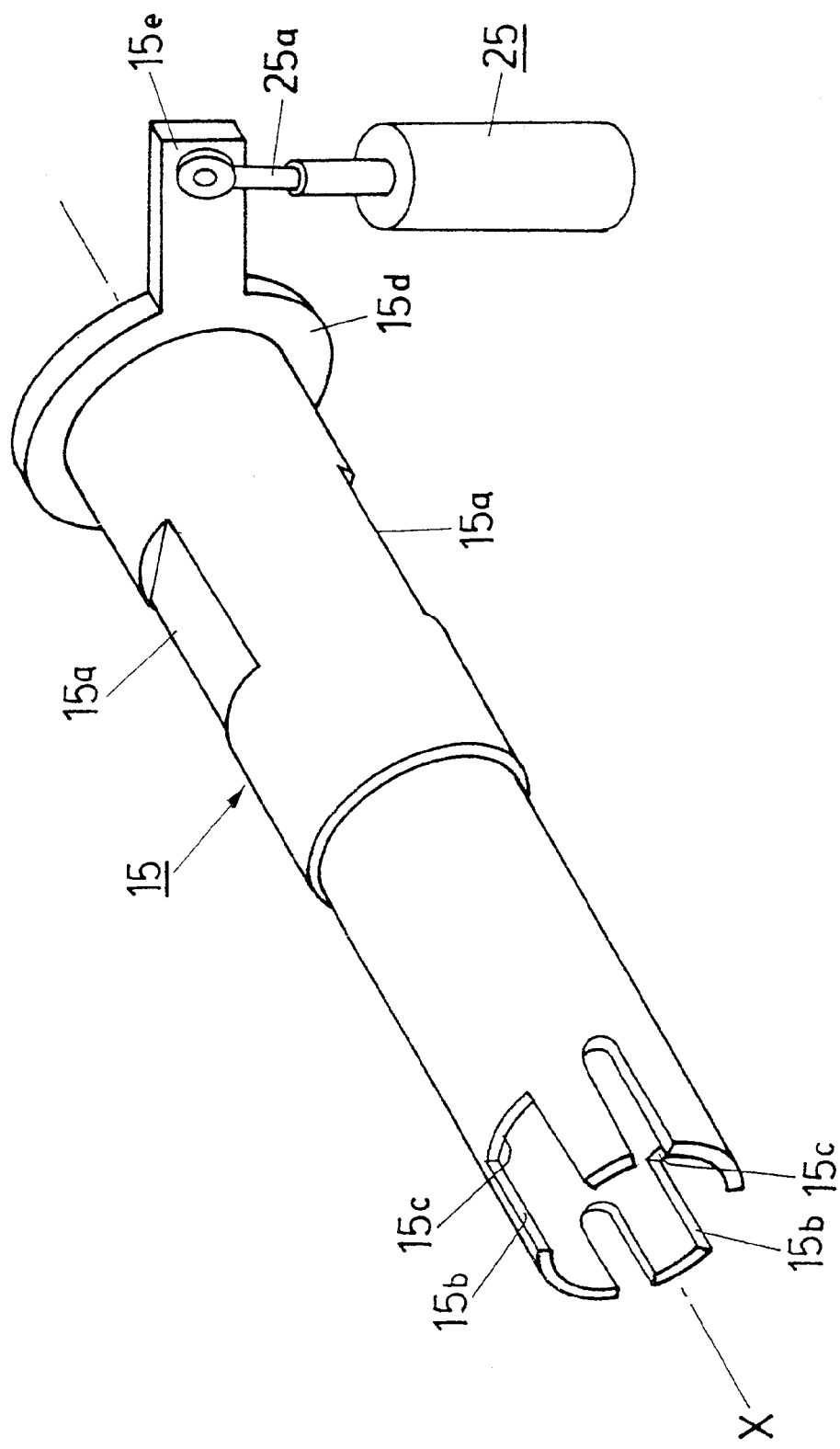
FIG. 4 is a perspective view showing only an inner shield of the same embodiment.

As for the cutter mounting bar 18, an adjustment screw 23 capable of advancing and retreating perpendicularly to the axis X is screwed into a rear end portion thereof and a tip end portion of the adjustment screw 23 is made to abut against a cam surface 15a of the inner shield 15 shown in FIG. 4, whereby rotation of the cutter mounting bar 18 is prevented.

The cutter mounting bar 18 has a movable blade 21 having a blade surface 21a integrally fixed to the tip end portion by screwing. Further, in correspondence to the movable blade 21, a backing blade 22 having a blade surface 22a is provided to be movable parallel to the axis X in a notched groove 15b shown in FIG. 4 until it abuts against a groove bottom surface 15c. A tension spring 24 is attached to be engaged in between the backing blade 22 and the cutter mounting bar 18, and the backing blade 22 is always allowed to abut against a stopper surface 18a of the cutter mounting bar 18. The movable blade 21 and the backing blade 22 constitute the cutter 20.

Figure 3:
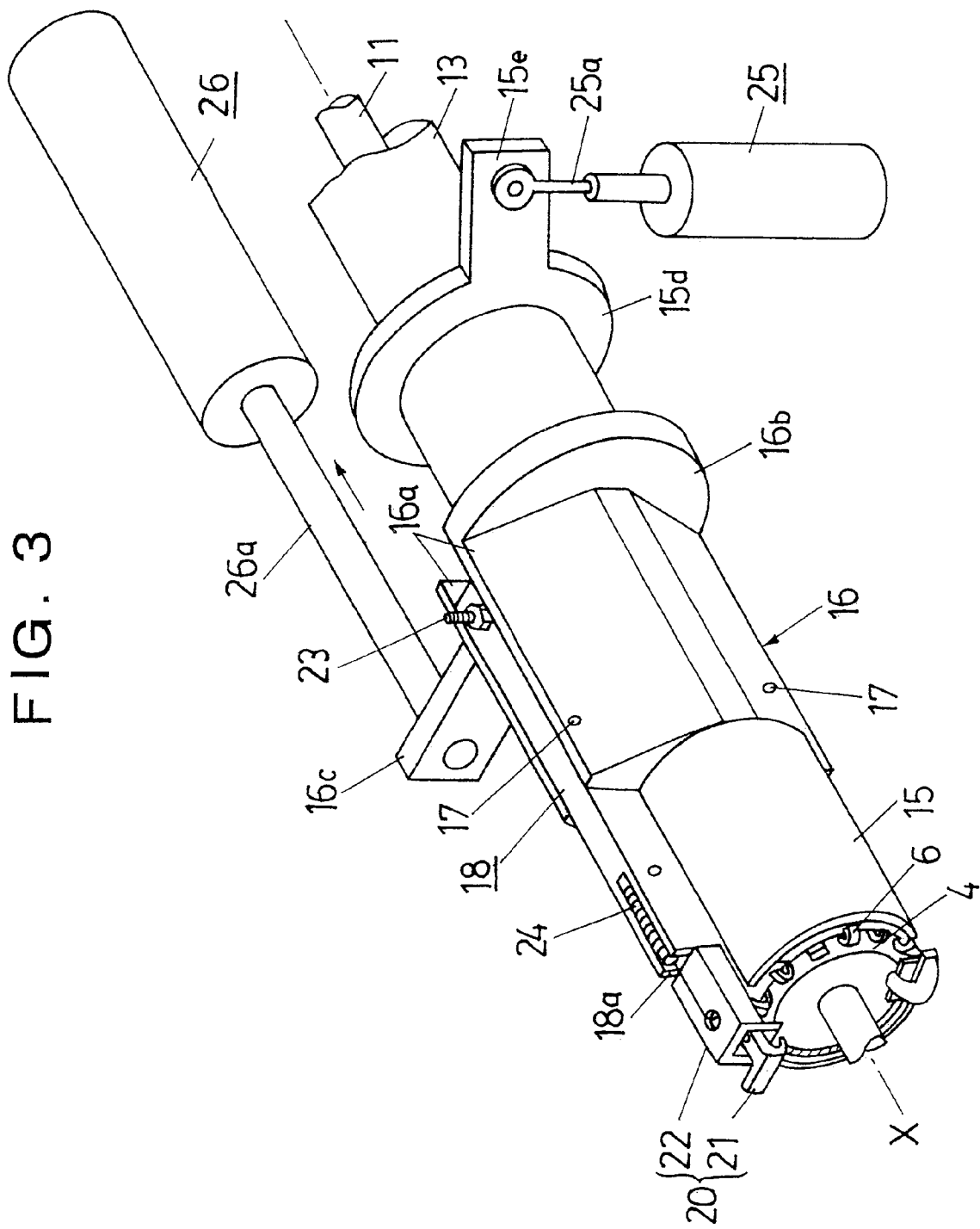
FIG. 3 is a perspective view of the same embodiment.

Further, flange portions 15d and 16b are formed at rear end portions of the inner shield 15 and the outer shield 16 respectively as shown in FIG. 3. Arm portions 15e and 16c in a radial direction are projectingly provided at the flange portions 15d and 16b. A rod 25a of a cylinder 25 for rotating the inner shield 15 is connected to the arm portion 15e, and a rod 26a of a cylinder 26 for advancing and retreating the outer shield 16 is connected to the arm portion 16c.

In the state in which the outer shield 16 is at the left end as shown in FIG. 1, by rotating the inner shield 15, the cutter 20 is allowed to get into the armature core 3 side at root portions of the hooks 6 and 6 located directly above and below the commutator 4, and the cutter mounting bar 18, the adjustment screw 23, the cam surface 15a and the compression spring 19 define cutter ingress means.

A pair of grippers 30 and 30 are supported to be swingably rotatable by shafts 31 and 31 provided at an apparatus fixing part with the axis X between them, above and below the collet unit 10 as shown in FIG. 1. A pair of the grippers 30 and 30 are biased outward by springs 32 and 32, and stoppers 33 and 33 restrict swing ends thereof.

Further, support shafts 40 and 40 approaching each other or separating from each other in a direction to intersect the axis X perpendicularly are provided at both ends of the collet unit 10 in the horizontal direction with the axis X between them as shown in FIG. 2, and known winding chucks (not shown) being able to grip the armature core 3 from both sides are swingably mounted at tip end portions of the support shafts 40 and 40, and a pair of flyers 41 and 41 are rotatably mounted behind them respectively.

Next, an operation of the winding apparatus constituted as above will be explained with reference to FIG. 5 through FIG. 10 showing each operation process in addition to FIG. 1 through FIG. 4, and as to the part in which the upper and lower portions are symmetrical in FIG. 1, only the operation of the upper portion will be explained and the operation of the lower portion will be omitted.

Figure 5:
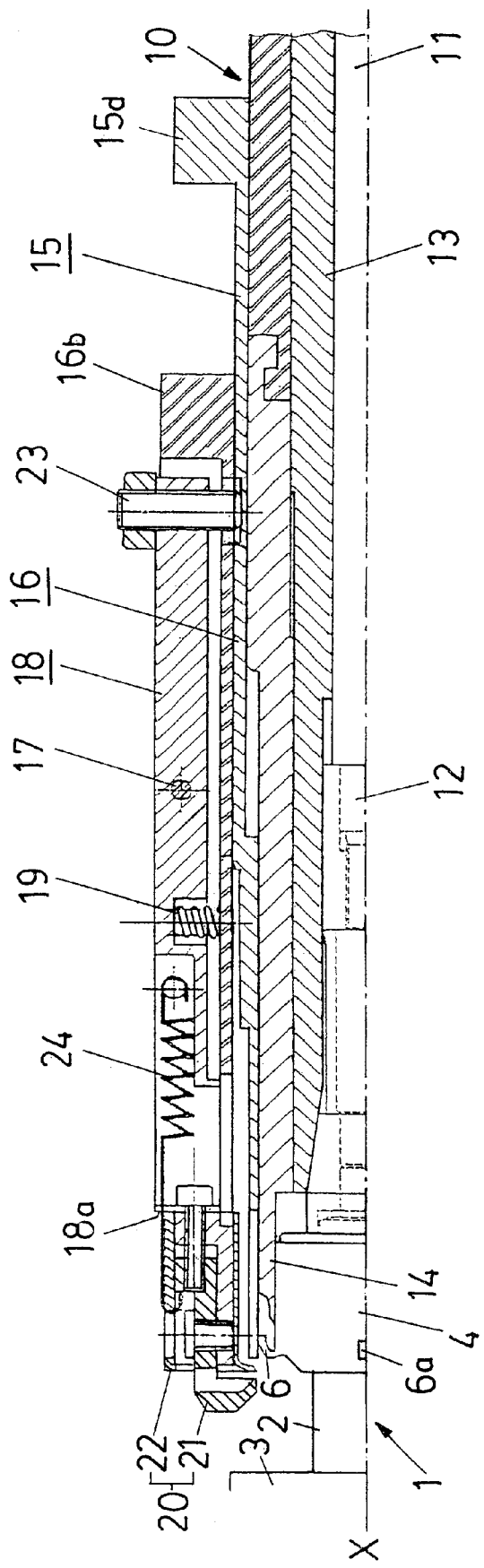
FIG. 5 is a longitudinal sectional view showing a first operation process of the same embodiment.

First, a lead of a start of a wire 7 drawn from the flyer 41 shown in FIG. 2 is gripped by the gripper 30 shown in FIG. 1, and the collet 12 to which the armature 1 is attached is rotated to position a first hook 6a of the commutator 4 just beside it (in a horizontal direction) (see FIG. 5).

Next, the outer tube 13 and the wire presser 14 are retreated rightward in FIG. 5 to release the gripping of the armature 1 by the collet 12 temporarily, then the shield 16 is retreated, and the lead of the wire 7 is looped around the first hook 6a to make start wire connection by the known wire connection method.

At this point of time, if the outer tube 13 and the wire presser 14 are advanced leftward, the collet 12 firmly grips the armature shaft 2, and at the same time, the tip end portion of the wire presser 14 presses and fixes the wire connection portion of the first hook 6a, and maintains this state until the wire winding is finished to prevent the first wire connection from falling off.

Figure 6:
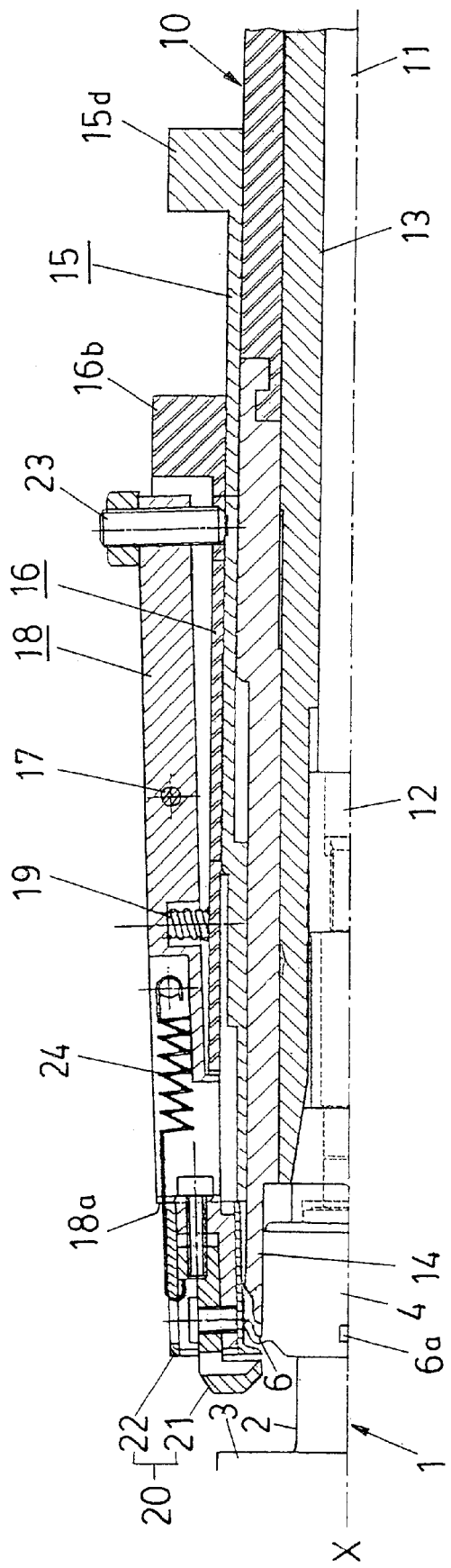
FIG. 6 is a longitudinal sectional view showing a second operation process of the same embodiment.

Here, after the outer shield 16 is advanced, the inner shield 15 is rotated a predetermined angle, the adjustment screw 23 is driven outward by the cam surface 15a (FIG. 4), the cutter mounting bar 18 is rotated in a direction in which its tip end side approaches the axis X against the biasing force of the compression spring 19, and the cutter 20 is made to get into the armature core 3 side at the root portion of the hook 6 of the commutator 4 to establish the state shown in FIG. 6.

Figure 7:
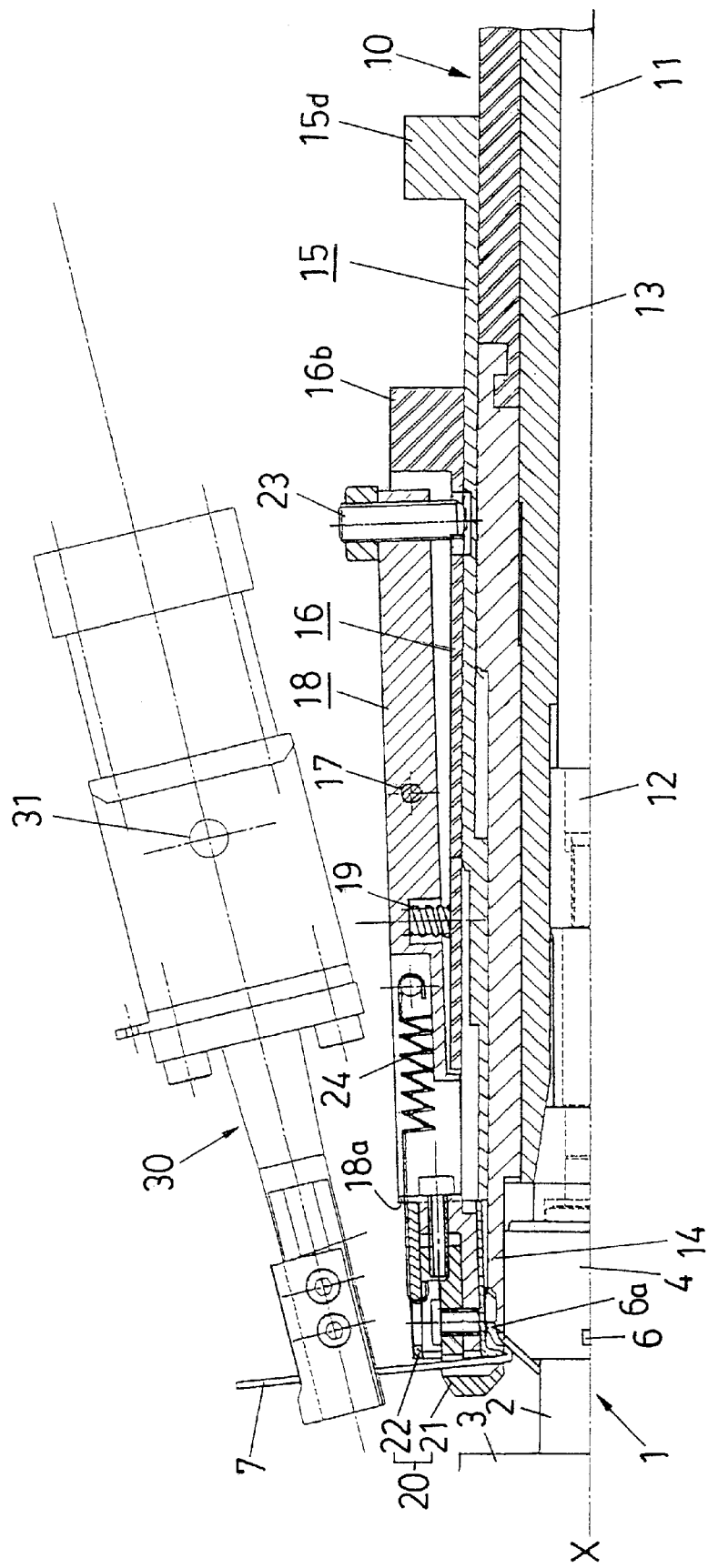
FIG. 7 is a longitudinal view showing a third operation process of the same embodiment.
Figure 9:
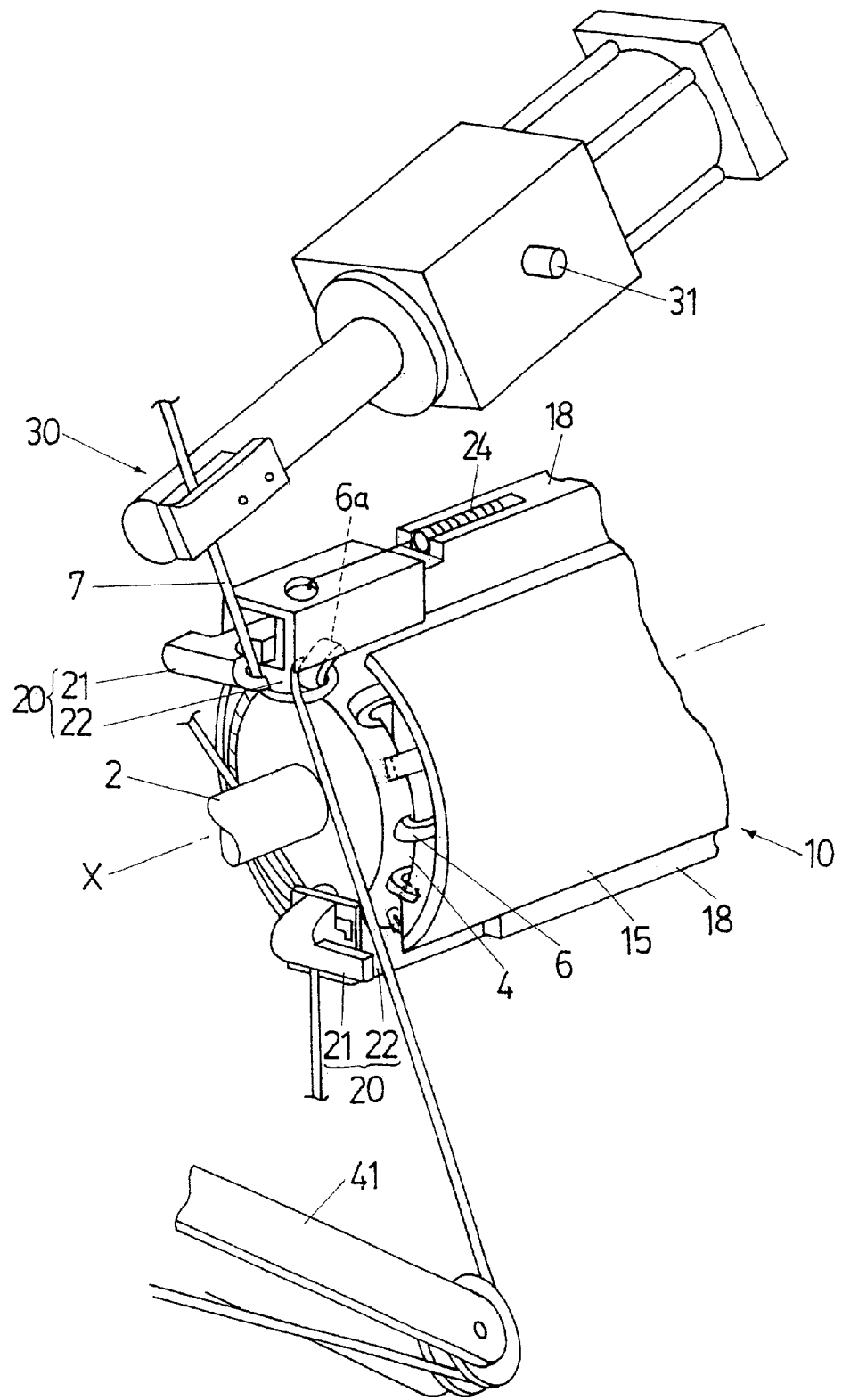
FIG. 9 is a perspective view showing a connection state at start of winding of the same embodiment.

In this state, when the collet 12 is rotated 90 degrees with the armature 1, the wire 7 connecting the gripper 30 and the wire connection portion of the first hook 6a is inserted between the movable blade 21 and the backing blade 22 to establish the state shown in FIG. 7 and FIG. 9.

Figure 8:
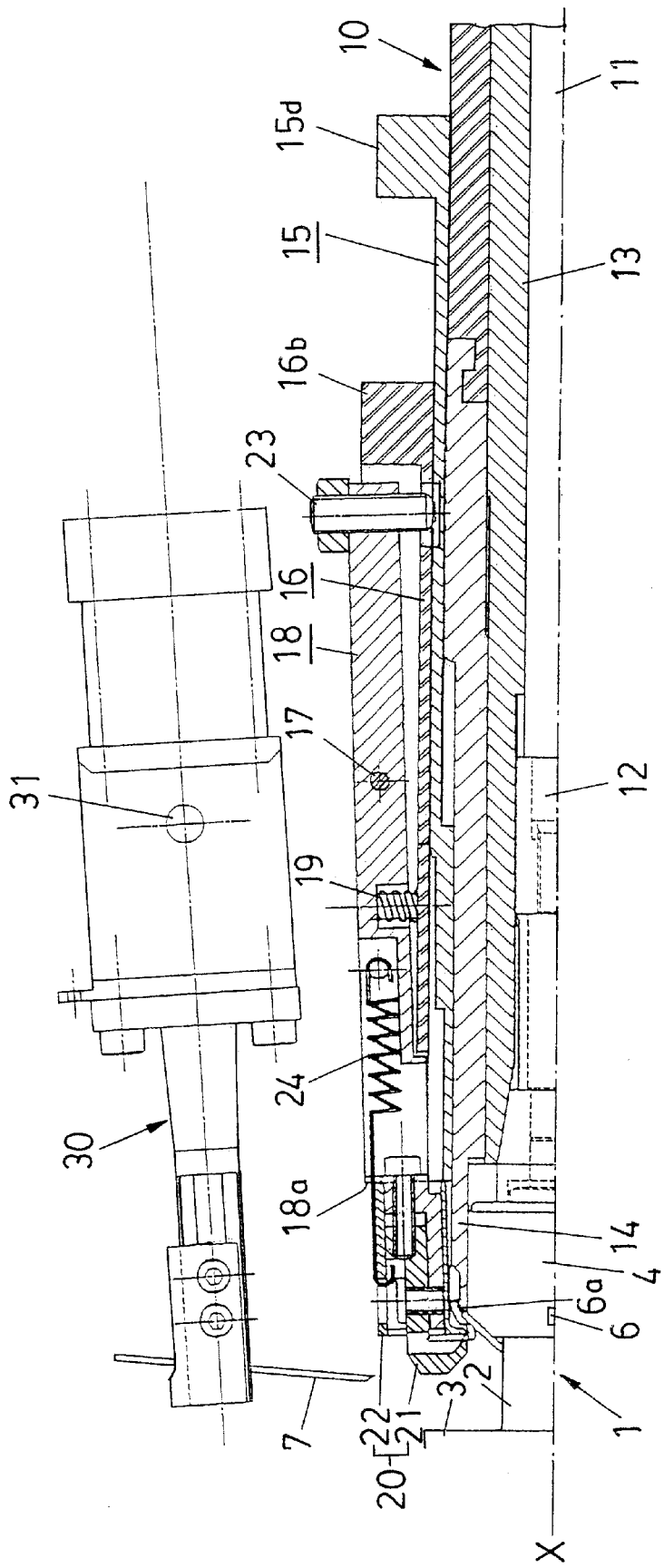
FIG. 8 is a longitudinal sectional view showing a fourth operation process of the same embodiment.

Subsequently, when the outer shield 16 is advanced rightward, the movable blade 21 integrated therewith is moved rightward and at the same time the backing blade 22 follows the outer shield 16 to move rightward at the same speed as that of the movable blade 21 by the biasing force of the tension spring 24. After the backing blade 22 is stopped with the right end surface thereof abutting against the groove bottom surface 15c (FIG. 4) of the inner shield 15, the outer shield 16 moves only the movable blade 21 integrated therewith further rightward while extending the tension spring 24. As a result, the wire 7 inserted between the movable blade 21 and the backing blade 22 is severed at the position close to the first hook 6a as shown in FIG. 8.

When the severing is finished, the inner shield 15 is inversely rotated, pressure on the adjustment screw 23 by the cam surface 15a is released, the tip end side of the cutter mounting bar 18 is rotated outward by the biasing force of the compression spring 19 and the outer shield 16 is advanced leftward to thereby return the cutter 20 at the initial position.

Next, the collet 12 is rotated a predetermined angle with the armature 1 to place the armature core 3 in the initial coil winding position, and the armature core 3 is held by a pair of the winding chucks not shown from both sides in the horizontal direction. Thus, the outer circumferential surface of the armature core 3 is covered, with only slots in which a wire is to be wound being left, and the wire 7 is wound in the exposed slots by the rotation of the flyer 41, whereby the first coil is formed.

After the formation of the first coil is finished, the aforementioned pair of winding chucks are retreated from the armature core 3, and after the collet 12 is rotated a predetermined angle to position a second hook just horizontally, the lead of the finish wire of the first coil is connected to the second hook to be made the lead of the start wire of the second coil.

Hereinafter, the same processes are repeated, whereby the second coil, the third coil, . . . are formed in succession, each time the lead of the coil is connected to each of the third hook, the fourth hook, . . . , and the final coil is formed. Subsequently, the outer tube 13 and the wire presser 14 are retreated temporarily to release the collet 12, and the lead at the finish of winding of the final coil is connected to the final hook (corresponding to the first hook with the wire wound by the other flyer).

Figure 10:
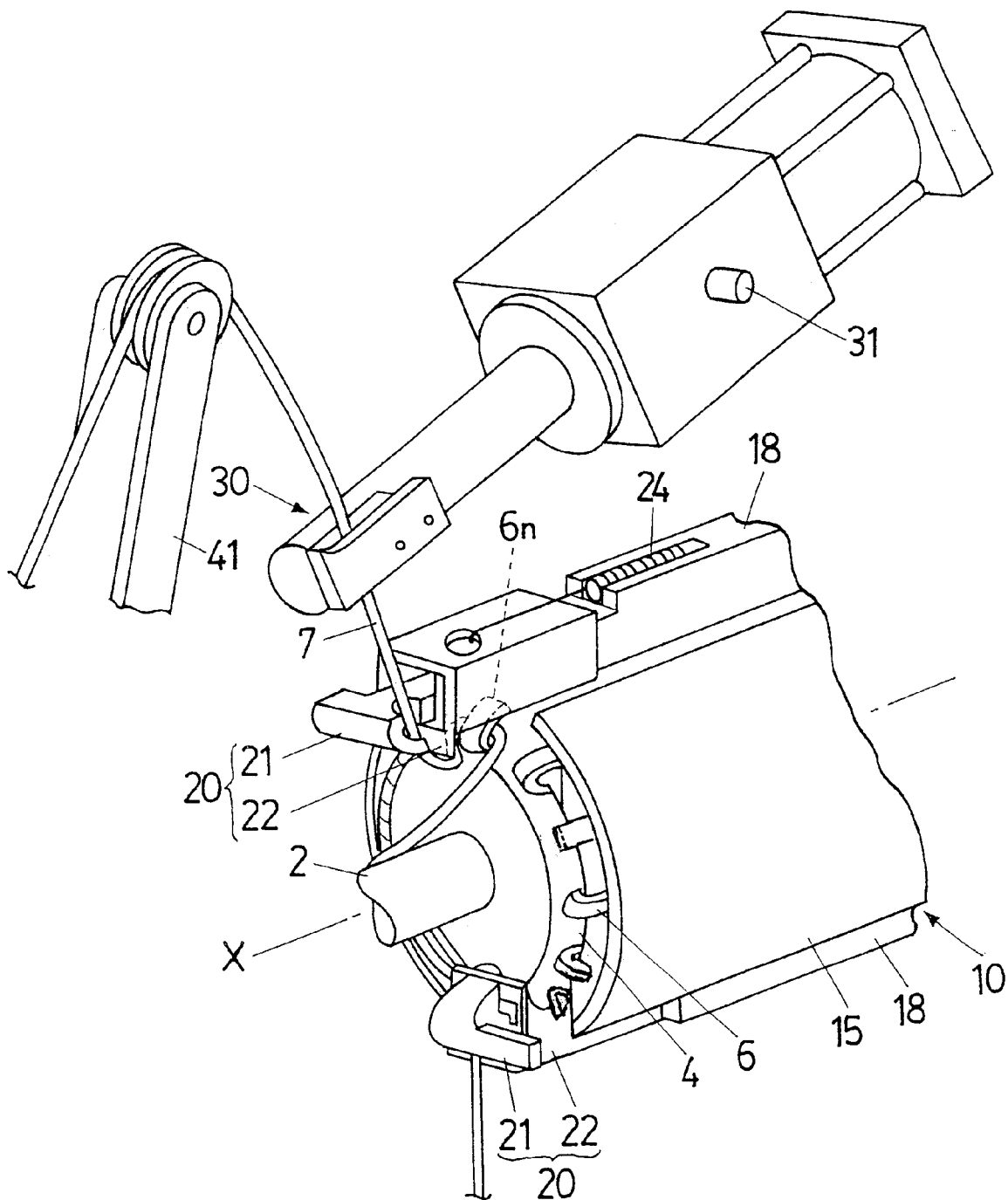
FIG. 10 is a perspective view showing a connection state at finish of winding of a coil of the same embodiment.
Figure 11:
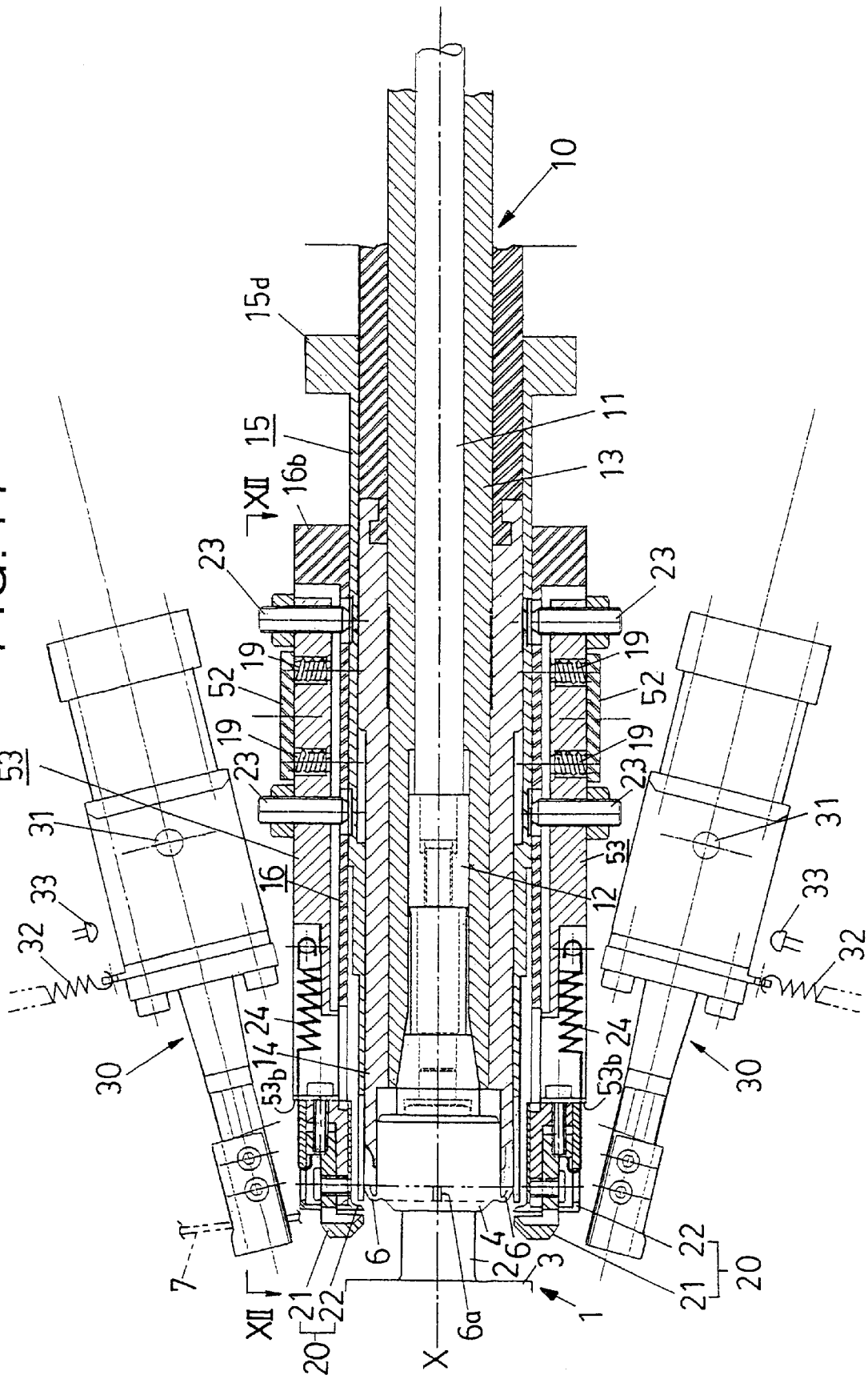
FIG. 11 is a longitudinal sectional view showing a main part of a second embodiment of the present invention.

Thereafter, the armature shaft 2 is gripped and rotated in the reverse direction again by the collet 12, then as shown in FIG. 10, a final hook 6n is positioned directly above, and the wire 7 fed from the flyer 41 is gripped by the gripper 30. The inner shield 15 is rotated a predetermined angle, and the adjustment screw 23 is driven outward by the cam surface 15a (see FIG. 4), and the cutter 20 is rotated in a direction to approach the axis X with the cutter mounting bar 18 against the biasing force of the compression spring 19.

Further, when the outer shield 16 is driven rightward, the movable blade 21 integrated with the cutter mounting bar 18 advancing rightward with this is moved rightward, and at the same time the backing blade 22 follows the shield 16 and is moved rightward by the biasing force of the tension spring 24.

After the backing blade 22 abuts against the groove bottom surface 15c (see FIG. 4) of the inner shield 15 and stops, the outer shield 16 moves only the movable blade 21 integrated therewith further rightward as it extends the tension spring 24. After the wire 7 inserted between the movable blade 21 and the backing blade 22 is thereby severed at the position close to the final hook 6n, the inner shield 15 is inversely rotated and the outer shield 16 is advanced leftward to prepare the next armature winding.

In this state, the cutter 20 is retreated outward, and therefore the armature 1 is freely attached to and detached from the collet unit 10. Incidentally, these operations are all performed in order by being automatically controlled by air pressure.

Second embodiment: FIG. 11 through FIG. 18

Next, a second embodiment of the armature winding apparatus according to this invention will be explained with reference to FIG. 11 through FIG. 14. In these drawings, the same components as in FIG. 1 through FIG. 4 are given the same numerals and symbols and the explanation thereof will be omitted.

Figure 12:
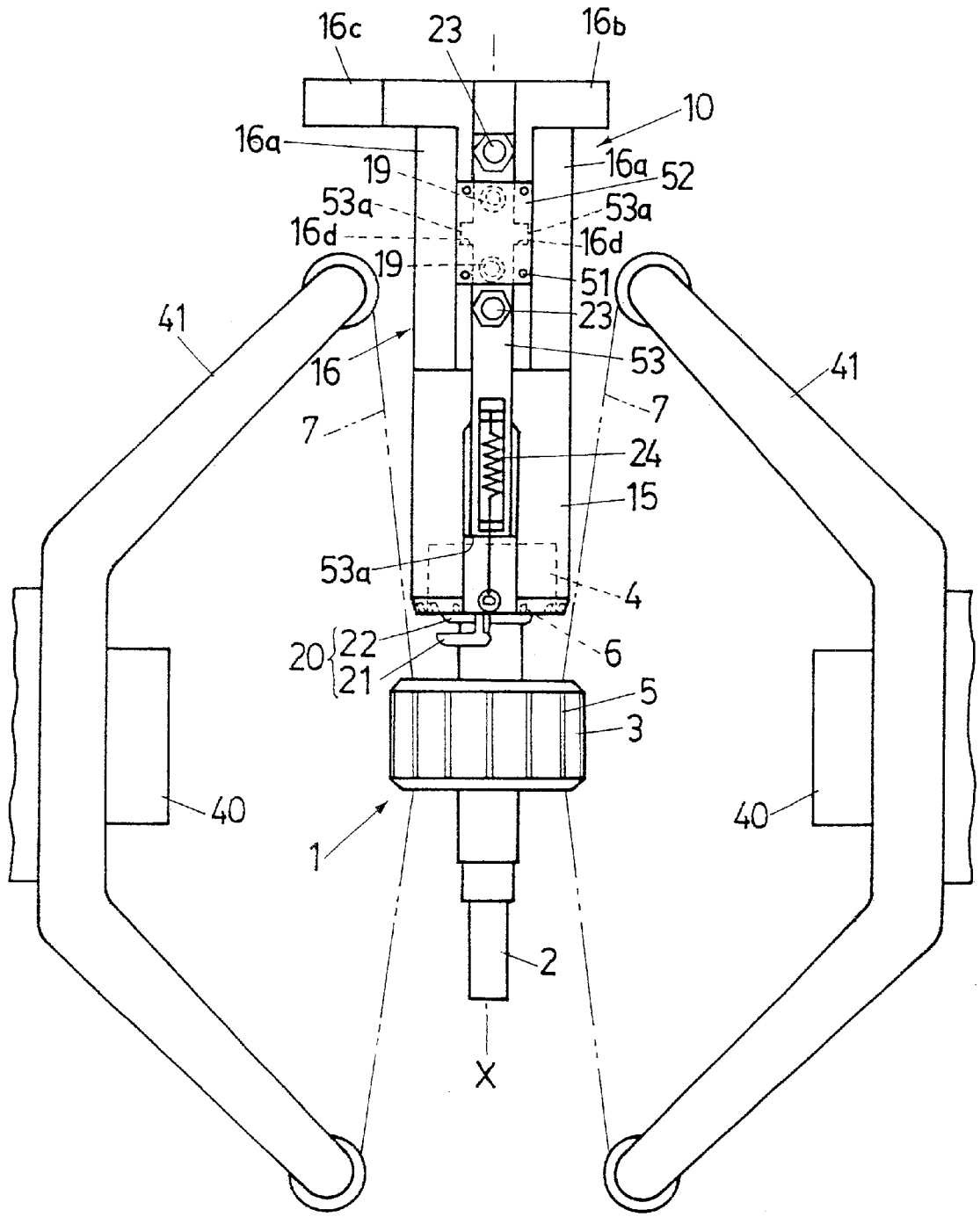
FIG. 12 is a plan view seen from a direction of the arrow XII—XII in FIG. 11 of the same embodiment.
Figure 13:
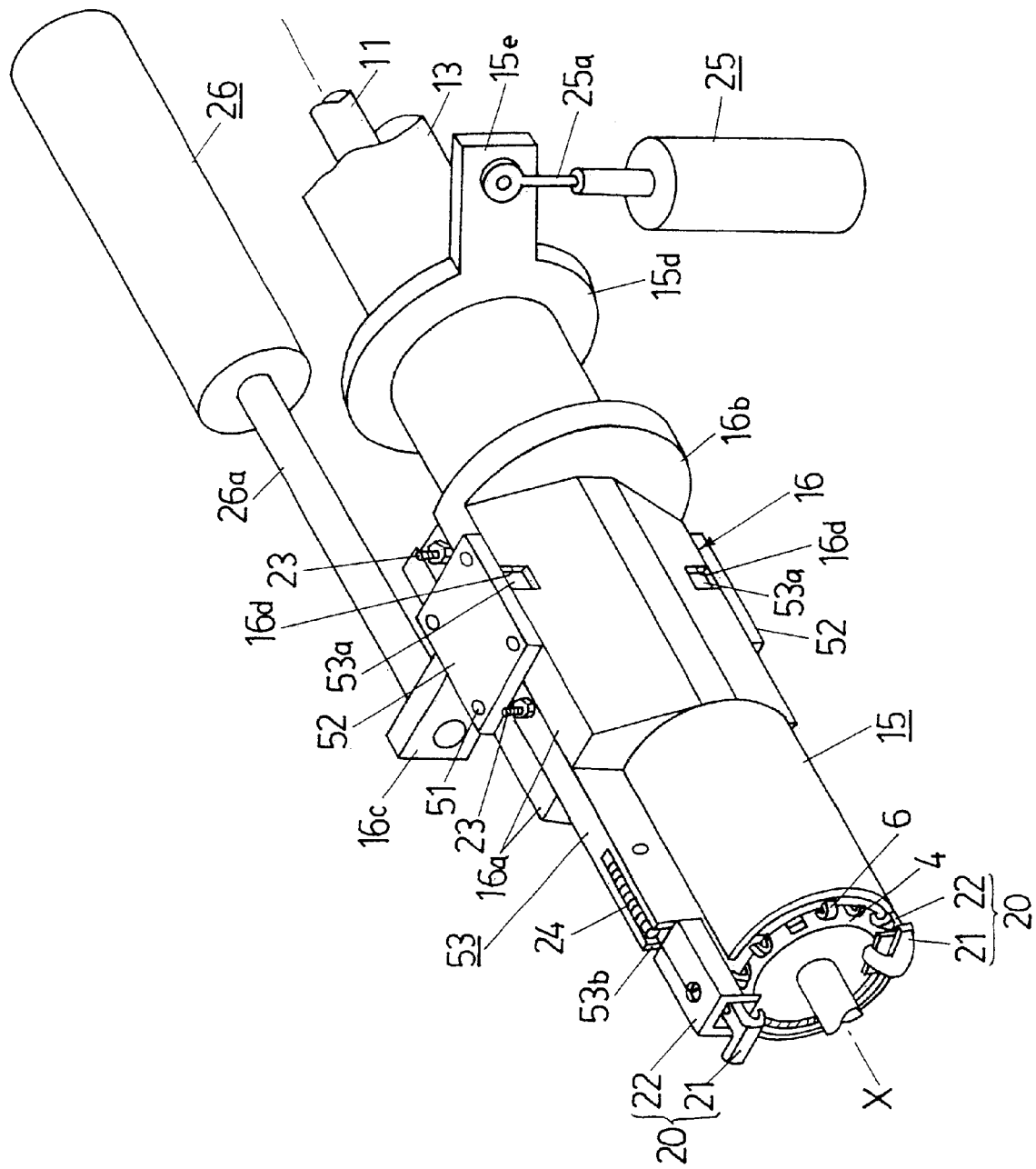
FIG. 13 is a perspective view of the same embodiment.

In this second embodiment, as shown in FIG. 12 and FIG. 13, pressing plates 52 and 52 are fixed to end surfaces of a pair of left and right side walls 16a and 16a, which are provided to extend upward and downward at the outer shield 16, with a plurality of screws 51 to form a space in which a cutter mounting bar 53 can be inserted to be displaceable between the both left and right side walls 16a and 16a.

Guides 53a and 53a are projectingly provided integrally at both sides in a width direction of the cutter mounting bar 53 while guide grooves 16d and 16d are formed in the both left and right side walls 16a and 16a of the outer shield 16, and the guides 53a are slidably attached in the guide grooves 16d. Thus, the cutter mounting bar 53 is made vertically movable in parallel and can be moved with the movement of the outer shield 16 in the direction of the axis X. A pair of compression springs 19 and 19 are engaged in between the cutter mounting bar 53 and the pressing plates 52, and the cutter mounting bar 53 is biased in a direction to approach the axis X.

Figure 14:
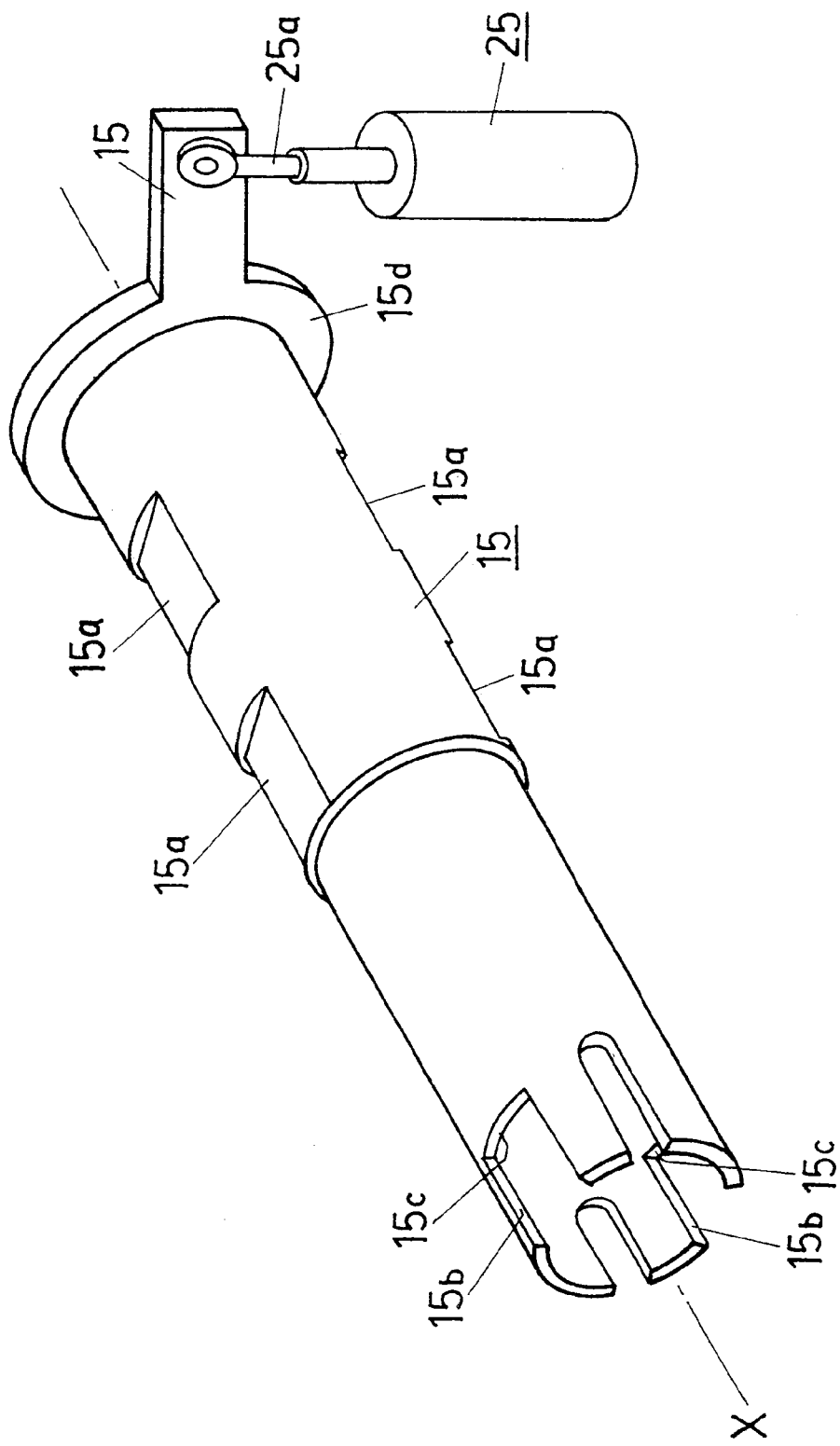
FIG. 14 is a perspective view showing only an inner shield of the same embodiment.

Further, a pair of the adjustment screws 23 and 23 are screwed into both sides in a longitudinal direction of the cutter mounting bar 53 with the presser plates 52 therebetween, and tip end portions thereof are enabled to abut against a pair of the cam surfaces 15a and 15a of the inner shield 15 shown in FIG. 14. As the inner shield 15 is rotated, the cam height of the cam surfaces 15a and 15a becomes lower, and the cutter mounting bar 53 is made movable in parallel in the direction to approach the axis X by the biasing force of the compression springs 19 and 19.

The movable blade 21 is integrally fixed to a tip end portion of the cutter mounting bar 53, in correspondence to which, the backing blade 22 is provided movable in the notch groove 15b shown in FIG. 14 in parallel with the axis X until it abuts against the groove bottom surface 15c, and the tension spring 24 is attached in between the backing blade 22 and the cutter mounting bar 53, whereby the backing blade 22 is always allowed to abut against a stopper surface 53b of the cutter mounting bar 53. The other constitution is the same as that of the first embodiment shown in FIG. 1 through FIG. 4.

Next, an operation thereof, mainly the points different from the aforementioned first embodiment will be explained with reference to FIG. 15 through FIG. 18.

Figure 15:
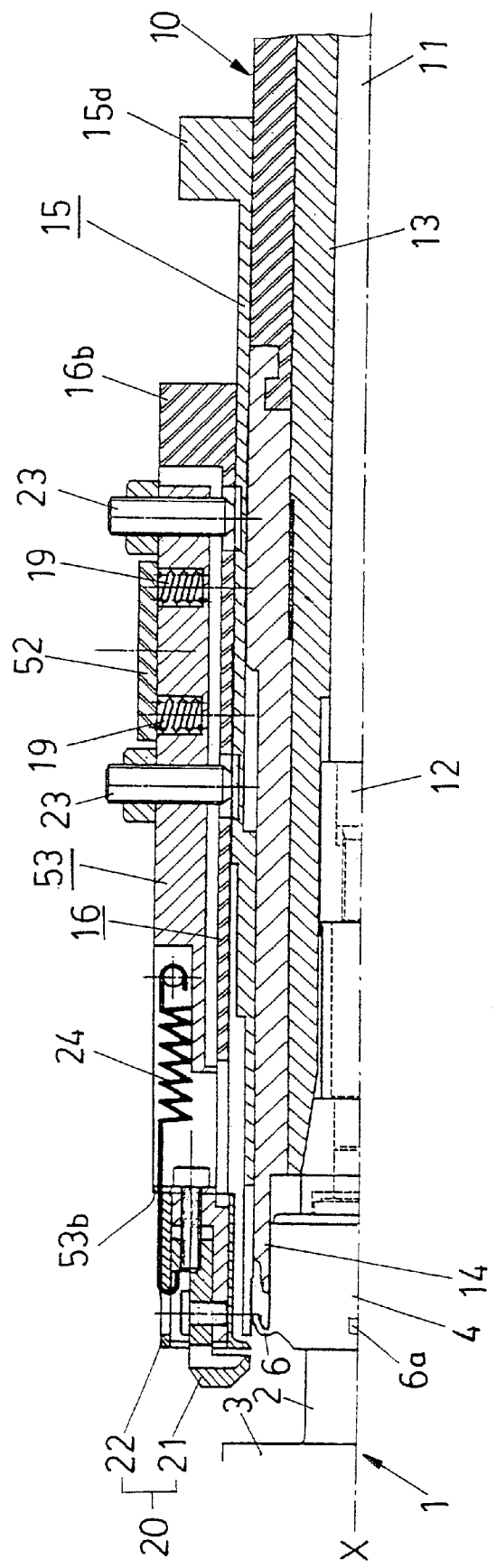
FIG. 15 is a longitudinal sectional view showing a first operation process of the same embodiment.

At the stage of the start of winding shown in FIG. 15, the cam surfaces 15a and 15a of the inner shield 15 press the adjustment screws 23 and 23 outward against the biasing force of the compression springs 19 and 19, the cutter mounting bar 53 is held at a position away from the axis X, and the wire presser 14 is at the position retreated rightward.

Figure 16:
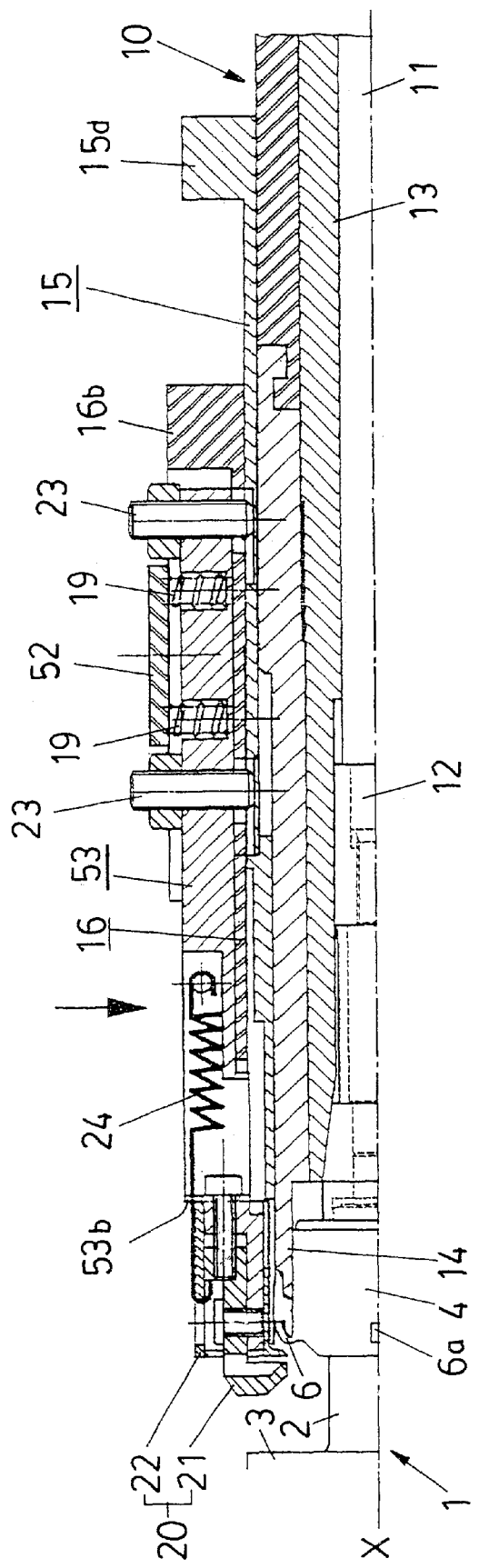
FIG. 16 is a longitudinal sectional view showing a second operation process of the same embodiment.

In this state, after the shield 16 is advanced leftward and connection of the start wire is made on the first hook 6a positioned just beside the commutator 4, the inner shield 15 is rotated a predetermined angle to lower the cam height of the cam surfaces 15a and 15a against which the adjustment screws 23 and 23 abut, whereby the cutter mounting bar 53 is moved in parallel in the direction to approach the axis X by the biasing force of the compression springs 19 and 19, and the cutter 20 is in the state in which it gets into a left side of the root portion of the hook 6 (see FIG. 16).

Figure 17:
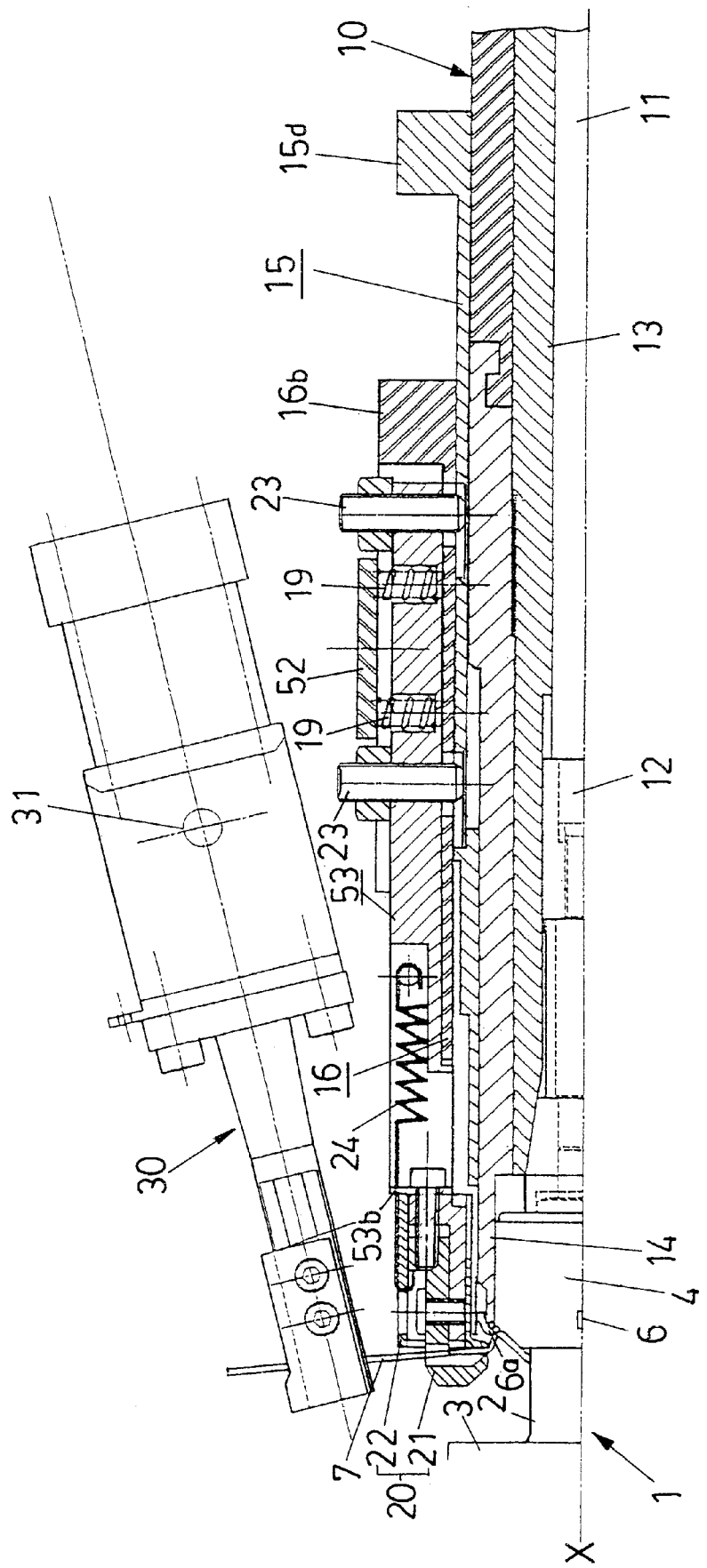
FIG. 17 is a longitudinal sectional view showing a third operation process of the same embodiment.
Figure 18:
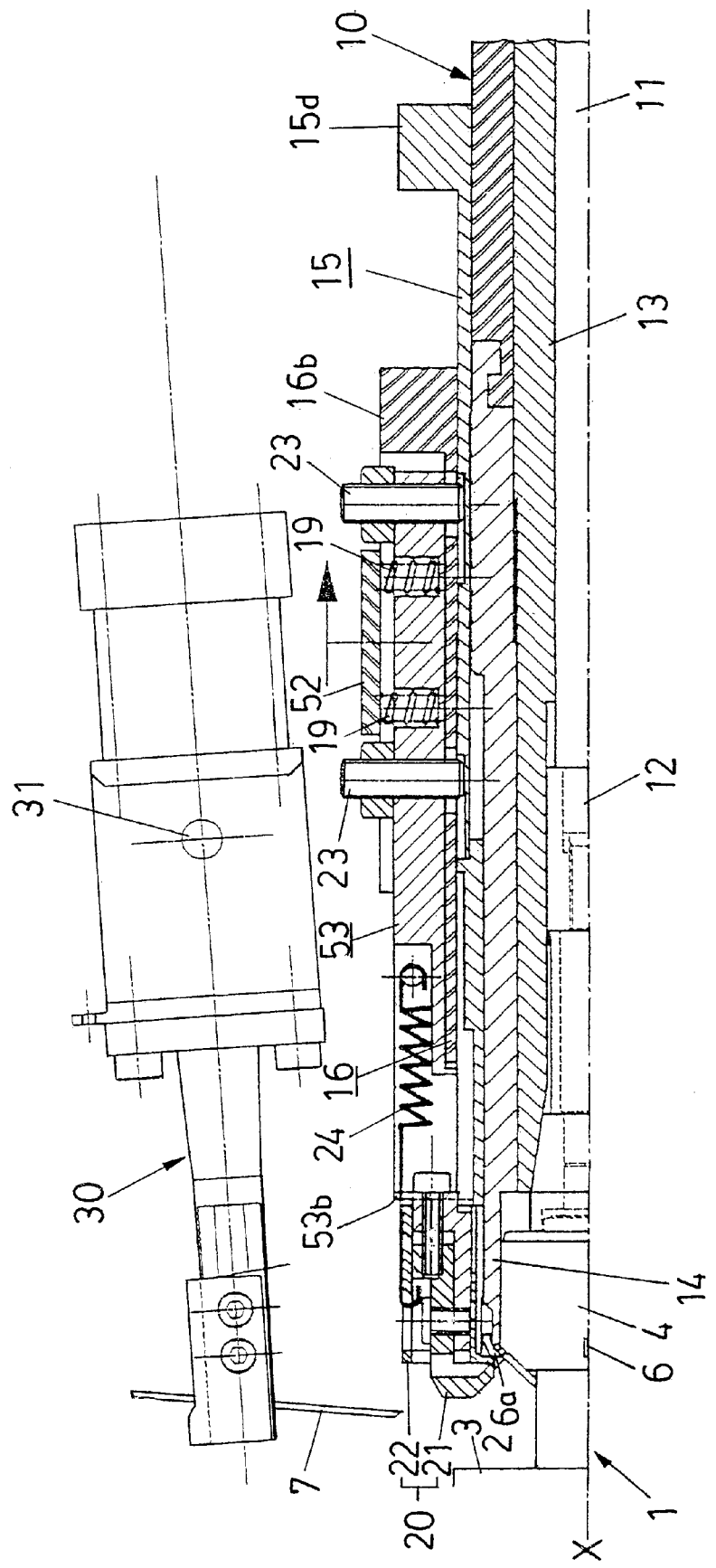
FIG. 18 is a longitudinal sectional view showing a fourth operation process of the same embodiment.
Figure 19:
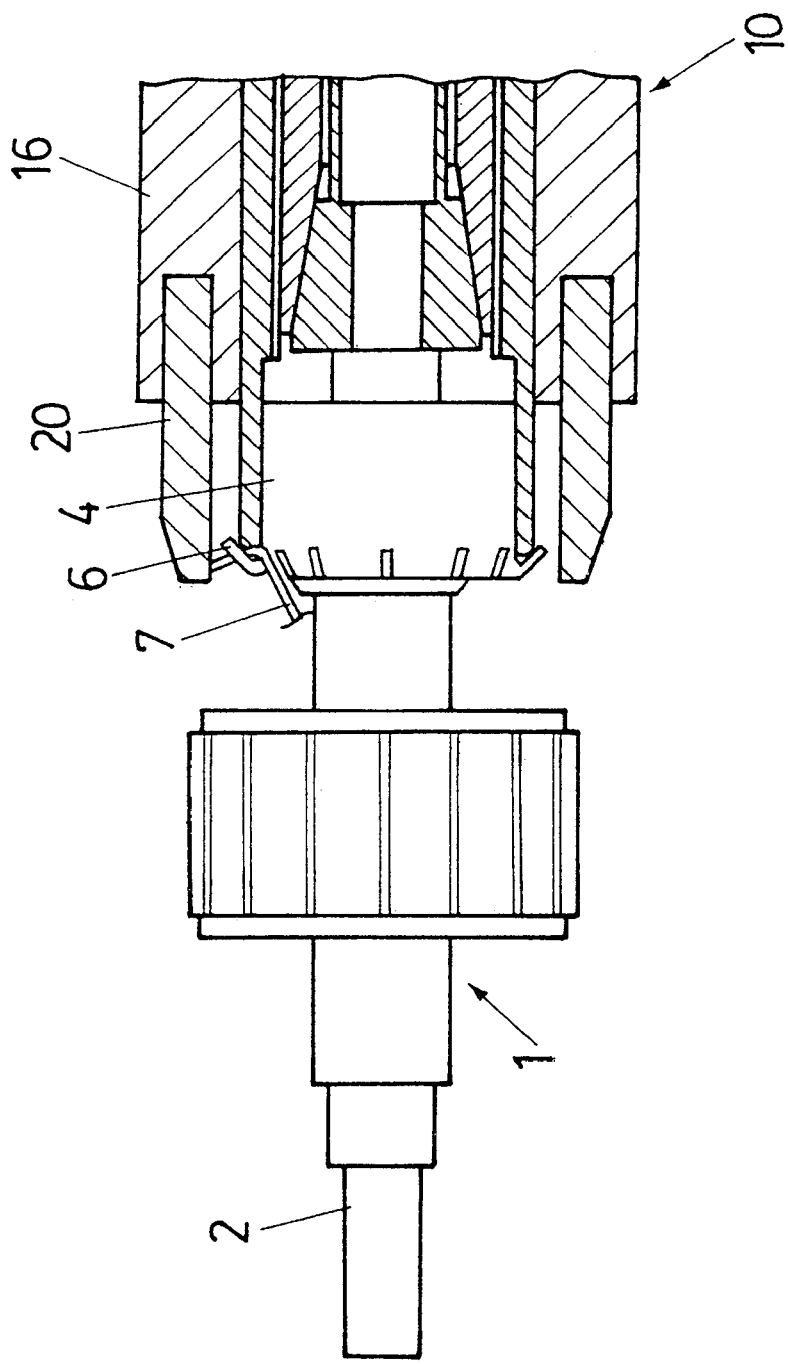
FIG. 19 is a sectional view of an essential part showing an example of a cutting device in a conventional armature winding apparatus.

After the wire presser 14 is advanced leftward in the state shown in FIG. 16 to press and fix the wire connection portion of the first hook 6a with its tip end portion, the collet 12 is rotated 90 degrees, whereby the wire 7 connecting the gripper 30 and the wire connection portion of the first hook 6a is inserted between the movable blade 21 and the backing blade 22 of the cutter 20 as shown in FIG. 17.

Next, when the shield 16 is advanced rightward with the cutter mounting bar 53, the movable blade 21 integrated therewith is moved rightward and at the same time the backing blade 22 also follows the cutter mounting bar 53 and moves rightward at the same speed as that of the movable blade 21 by the biasing force of the tension spring 24. After a right end surface of the backing blade 22 abuts against the groove bottom surface 15c of the inner shield 15 and stops, the outer shield 16 moves only the movable blade 21 further rightward while extending the tension spring 24, and the wire 7 is severed at the position close to the first hook 6a (see FIG. 18).

When the severing is finished, the inner shield 15 is inversely rotated to press the adjustment screw 23 by the cam surface 15a and press the cutter mounting bar 53 upward against the biasing force of the compression spring 19, whereby the cutter 20 is returned to the first state.

Thereafter, by the same operation as the aforementioned first embodiment, winding of the coil around the slot 5 of the armature core 3 and connection of the lead on the hook 6 of the commutator 4 are repeated. After the connection of the lead at the finish of winding of the final coil is performed onto the hook 6n, the final hook 6n is positioned directly above as shown in FIG. 10. At this time, the wire 7 fed from the flyer 41 is gripped by the gripper 30, and the inner shield 15 is rotated again to move the cutter mounting bar 18 in the direction to approach the axis X by the biasing force of the compression spring 19.

In this state, when the outer shield 16 is moved rightward, the movable blade 21 and the backing blade 22 both advance rightward, and after the backing blade 22 is stopped, only the movable blade 21 advances rightward, whereby the wire 7 is severed at the position close to the final hook 6n to prepare for the next armature winding.

Matters common to each embodiment

As described above, in each embodiment, it is made possible to sever the leads at the start and the finish of winding of each coil at the position close to the wire connection portion onto the hook, and the cutter is always maintained in an open state to make it possible to attach and detach the armature to and from the collet unit 10.

Further, when the commutator outer diameter of the armature around which the wire is to be wound is changed, if an outer cylinder or the like of the chuck unit is replaced correspondingly to this, the cutting device is replaced at the same time, and thus troublesome adjustment is not required.

In each of the above-described embodiments, the explanation is made as to the case in which this invention is applied to the dual drive winding apparatus, but this can be carried out in the armature winding apparatuses other than this without a hitch.

Effects of this invention

As described thus far, according to this invention, the effects described as follows are obtained.

According to the armature winding apparatus of this invention, the cutting device for severing the leads of the start wire and final wire of each coil to be wound around the armature maintains the cutters in an open state so that attachment and detachment of the armature to and from the collet unit can be facilitated, and it can sever the lead of the coil at the position close to the wire connection portion of the hook by retreating the outer shield in the state in which the cutter is made closer to the axis of the outer shield.

Further, a cutter mounting member is inserted to be displaceable between a pair of side walls extensively provided at the outer shield to be displaceable, whereby the cutter can be stably held.

If the cutter mounting member is mounted to the outer shield to be swingably rotatable with respect to the axis thereof, the cutter can advance and retreat extremely easily and reliably. Alternatively, if the cutter mounting member is mounted to the outer shield to be able to advance and retreat in parallel with respect to the axis thereof, the moving direction of the cutter becomes parallel with respect to the above-described axis when the outer shield moves in the axial direction, and thus the coil lead can be severed efficiently.

Further, if the cutter mounting member of the cutting device has the cutter ingress means capable of making the cutter get into the armature core side at the hook root portion of the armature commutator by rotating the inner shield a predetermined angle around the axis, the cutter can be easily made to get into and out of it.

Furthermore, if the cutter ingress means is constituted by the adjustment screws screwed into the cutter mounting member to be able to advance and retreat in the direction to intersect the axis of the inner shield perpendicularly, the cam surfaces, which is provided on the outer circumferential portion of the inner shield and with which the adjustment screws are able to be engaged, and the biasing means for pressing the adjustment screws against the cam surfaces, the degree of the ingress of the cutter can be finely adjusted.

Further, if the cutter is constituted by the movable blade integrated with the cutter mounting member and the backing blade opposing this movable blade, the backing blade is biased in the direction to be pressed in contact with the cutter mounting member and is made to follow the movement of the cutter mounting member following the retreat of the outer shield and to move simultaneously with the cutter mounting member until it abuts against the inner shield and stops, the wire inserted between the movable blade and the backing blade is sandwiched between the stopped backing blade and the advancing movable blade and is surely severed.

Further, if the wire presser capable of pressing the wire connection portion of the hook of the armature commutator is provided at the inner circumferential portion of the inner shield in the above-described cutting device to be movable in the axial direction of the inner shield, the wire connection portion is pressed at the time of severing of the coil lead, thus eliminating the fear that the lead of the coil falls off the hook.

What is claimed is:

1. An armature winding apparatus comprising a collet unit having on an outer circumferential portion, an outer shield movable for a predetermined distance in a direction of a central axis of the collet unit and an inner shield rotatable at a predetermined angle around the collet unit central axis, flyers for feeding and winding wires on slots of an armature core supported by said collet unit to have an armature core central axis conform with the collet unit central axis and to be able to perform indexing rotation by the collet unit, while rotating, to form coils in succession, a mechanism for looping wires at both end portions of the coils around hooks of an armature commutator, and cutting devices for severing coil leads at a start and a finish of winding of the coil, wherein said cutting devices have cutter mounting members attached to said outer shield to be displaceable within a plane including the collet unit central axis and move with the outer shield in the direction of the collet unit central axis, and cutters provided at tip end portions of the cutter mounting members to be able to advance to and retreat from the collet unit central axis.

2. An armature winding apparatus according to claim 1, wherein said cutter mounting members of said cutter device are inserted to be displaceable between a pair of side walls extensively provided at said outer shield to be displaceable.

3. An armature winding apparatus according to claim 1, wherein said cutter mounting members of said cutting device are attached to said outer shield to be swingably rotatable within a plane including the collet unit central axis.

4. An armature winding apparatus according to claim 1, wherein said cutter mounting members of said cutting device are attached to said outer shield to be able to advance and retreat in parallel with respect to the collet unit central axis.

5. An armature winding apparatus according to claim 1, wherein said cutter mounting members of said cutting device have cutter ingress means for making said cutter get into the armature core side at a hook root portion of the armature commutator by rotating said inner shield a predetermined angle around the collet unit central axis.

6. An armature winding apparatus according to claim 1, wherein each said cutter of said cutting device comprises a movable blade intergrated with said cutter mounting members, and a backing blade, which is provided to oppose the movable blade, biased in a direction to be pressed in contact with said cutter mounting members, follows movement of said cutter mounting members following retreat of said outer shield, and moves with said cutter mounting members until it abuts against said inner shield and stops.

7. An armature winding apparatus according to claim 1, wherein a wire presser capable of pressing a wire connection portion of a hook of the armature commutator is provided at an inner circumferetial portion of said inner shield to be movable in the direction of the collet unit central axis.

8. An armature winding apparatus comprising a collet unit having on an outer circumferential portion, an outer shield movable for a predetermined distance in a direction of a central axis of the collet unit and an inner shield rotatable at a predetermined angle around the collet unit central axis, flyers for feeding and winding wires on slots of an armature core supported by said collet unit to have an armature core central axis conform with the collet unit central axis and to be able to perform indexing rotation by the collet unit, while rotating, to form coils in succession, a mechanism for looping wires at both end portions of the coils around hooks of an armature commutator, and cutting devices for severing coil leads at a start and a finish of winding of the coil, wherein said cutting devices have cutter mounting members attached to said outer shield to be displaceable within a plane including the collet unit central axis and move with the outer shield in the direction of the collet unit central axis, and cutters provided at tip end portions of the cutter mounting members to be able to advance to and retreat from the collet unit central axis, said cutter mounting members of said cutting device have cutter ingress means for making said cutter get into the armature core side at a hook root portion of the armature commutator by rotating said inner shield a predetermined angle around the collet unit central axis, and said cutter ingress means comprises adjustment screws screwed into said cutter mounting members to be able to advance and retreat in a direction to intersect the collet unit central axis perpendicularly, cam surfaces, which are provided at an outer circumferential portion of said inner shield and are able to be engaged with the adjustment screws, and biasing means for pressing the adjustment screws against the cam surfaces.

* * * * *